(12) United States Patent
Rehman et al.

(10) Patent No.: US 9,881,265 B2
(45) Date of Patent: Jan. 30, 2018

(54) METHOD AND SYSTEM FOR IMPLEMENTING HISTORICAL TRENDING FOR BUSINESS RECORDS

(71) Applicant: ORACLE INTERNATIONAL CORPORATION, Redwood Shores, CA (US)

(72) Inventors: Muhammad Rehman, San Jose, CA (US); Mark Alan Kleidon, Livermore, CA (US); Bina Sunil Patel, San Jose, CA (US); Arkadiusz Bigos, Warsaw (PL); Arun Balasubramanyam, Newark, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 274 days.

(21) Appl. No.: 14/611,146

(22) Filed: Jan. 30, 2015

(65) Prior Publication Data
US 2016/0224633 A1     Aug. 4, 2016

(51) Int. Cl.
*G06F 17/30*    (2006.01)
*G06Q 10/06*    (2012.01)

(52) U.S. Cl.
CPC ..... *G06Q 10/063* (2013.01); *G06F 17/30309* (2013.01); *G06F 17/30548* (2013.01)

(58) Field of Classification Search
CPC ........ G06F 17/30309; G06F 17/30548; G06F 17/30528; G06F 17/30554; G06F 17/30392; G06F 17/30864; G06F 3/04842; G06F 3/0482; G06F 3/04817; G06F 3/0481; G06F 3/0484; G06F 21/6245; G06F 17/30; G06Q 50/265; G06Q 10/0637; G06Q 10/063
See application file for complete search history.

(56) References Cited

U.S. PATENT DOCUMENTS

| | | | |
|---|---|---|---|
| 6,904,449 B1 * | 6/2005 | Quinones | G06Q 10/10 709/203 |
| 7,536,686 B2 | 5/2009 | Tan | |
| 8,346,929 B1 * | 1/2013 | Lai | G06Q 10/10 709/226 |
| 9,094,744 B1 * | 7/2015 | Lu | H04R 3/005 707/741 |
| 2005/0055275 A1 | 3/2005 | Newman | |
| 2007/0162420 A1 | 7/2007 | Ou | |
| 2008/0084573 A1 | 4/2008 | Horowitz | |

(Continued)

OTHER PUBLICATIONS

Akel, Laura, "Oracle ADF 11g Primer-Introduction to the building blocks of a Fusion Web application," An Oracle White Paper, Apr. 2007.

(Continued)

*Primary Examiner* — Anh Ly
(74) *Attorney, Agent, or Firm* — Vista IP Law Group, LLP

(57) ABSTRACT

Disclosed is an improved method, system, and program product to implement a business platform that assigns a server instance and dedicated database to each business customer. A snapshot of data is periodically copied from one or more database tables to a historical table of the dedicated database. Data is retrieved in response to a query from the historical table, enabling historical trending capabilities without affecting a performance of other business customers of the business platform.

26 Claims, 11 Drawing Sheets

(56) References Cited

U.S. PATENT DOCUMENTS

| | | | |
|---|---|---|---|
| 2008/0109445 A1 | 5/2008 | Williams | |
| 2008/0201248 A1* | 8/2008 | Wellons | G06Q 20/102 705/35 |
| 2009/0089078 A1 | 4/2009 | Bursey | |
| 2009/0234860 A1 | 9/2009 | Brown | |
| 2009/0327006 A1* | 12/2009 | Hansan | G06Q 10/10 705/317 |
| 2011/0296336 A1 | 12/2011 | Law | |
| 2012/0035992 A1* | 2/2012 | Tanaka | G06Q 30/0241 705/14.4 |
| 2013/0144855 A1 | 6/2013 | Kaul | |
| 2013/0187926 A1 | 7/2013 | Silverstein | |
| 2013/0218923 A1 | 8/2013 | Kaul | |
| 2013/0282509 A1 | 10/2013 | Strong | |
| 2013/0290244 A1 | 10/2013 | Nucci | |
| 2013/0290381 A1 | 10/2013 | Nucci | |
| 2014/0181020 A1* | 6/2014 | Kreindlina | G06F 17/30575 707/624 |
| 2014/0195416 A1* | 7/2014 | Linscott | G06Q 20/102 705/39 |
| 2014/0222637 A1* | 8/2014 | Giles | G06Q 40/02 705/35 |
| 2014/0280193 A1* | 9/2014 | Cronin | G06F 17/30539 707/741 |
| 2014/0280808 A1* | 9/2014 | Du | G06Q 10/0631 709/222 |
| 2014/0351241 A1 | 11/2014 | Leask | |
| 2014/0351261 A1 | 11/2014 | Aswani | |
| 2015/0012382 A1* | 1/2015 | Ceribelli | G06Q 50/01 705/26.35 |
| 2015/0120532 A1 | 4/2015 | Jung | |
| 2015/0193531 A1 | 7/2015 | Mandelstein | |
| 2015/0242106 A1 | 8/2015 | Penha | |
| 2015/0317572 A1 | 11/2015 | Balasubramanian | |
| 2015/0347542 A1* | 12/2015 | Sullivan | G06F 17/30563 707/602 |
| 2016/0224194 A1 | 8/2016 | Pacalin et al. | |
| 2016/0224615 A1 | 8/2016 | Rehman et al. | |
| 2016/0267503 A1 | 9/2016 | Zakai-Or | |

OTHER PUBLICATIONS

Pundpal, Anupama, "Oracle Fusion Applications", Installation Guide, 11g Release 8, Jun. 2014, 738 pages.

Hobin, Dona, "Oracle Fusion Middleware", User's Guide for Oracle Business Intelligence Enterprise Edition (Oracle Fusion Applications Edition), 11 g Release 1, Jun. 2012, 988 pages.

Non-final Office Action dated Apr. 10, 2017 for related U.S. Appl. No. 14/611,132.

Non-final Office Action dated Jun. 30, 2017 for related U.S. Appl. No. 14/611,111.

Final Office Action dated Sep. 14, 2017 for related U.S. Appl. No. 14/611,132.

* cited by examiner

METHOD AND SYSTEM FOR IMPLEMENTING HISTORICAL TRENDING FOR BUSINESS RECORDS

CROSS-REFERENCE TO RELATED APPLICATION(S)

This application is cross-related to U.S. patent application Ser. No. 14/611,111 filed concurrently entitled "METHOD AND SYSTEM FOR PRESENTING BUSINESS INTELLIGENCE INFORMATION THROUGH INFOLETS," under U.S. patent application Ser. No. 14/611,132 filed concurrently entitled "METHOD AND SYSTEM FOR EMBEDDING THIRD PARTY DATA INTO A SAAS BUSINESS PLATFORM,". The content of the aforementioned patent applications is hereby expressly incorporated by reference in its entirety.

BACKGROUND

Software as a Service ("SaaS") business models have seen a steady rise in the past few years, especially in the realm of enterprise software companies. SaaS refers to a business model in which software may be licensed to one or more business customers on a subscription basis or some other type of payment model and is typically centrally hosted in the cloud. SaaS is typically accessed by a user through a web browser. One of the chief advantages of using SaaS business models is that the burden and cost related to maintenance and support is removed or minimized for the business, and instead placed on the SaaS provider (e.g., Oracle Inc., etc.) instead.

By using SaaS platforms, businesses can access the required software service via a remote server hosting the software service and use the software service to collect and analyze transactional and business-related data in a centralized location. One of the key functionalities that many businesses need and utilize heavily is historical trending/analysis functionality. Businesses may benefit from analyzing past business records, or data collected over time. Analyzing business records (e.g., sales opportunities, sales numbers, revenue, etc.) over time may lead to valuable insights and may help businesses strategize business tactics for the present and future. In the context of SaaS applications, this may pose a set of unique challenges.

A SaaS application is typically accessed by multiple business customers, who all access and interact with the application through a common user interface. Although each of the business customer uses the same interface, each business customer is directed (e.g., through an authentication process, etc.) to a dedicated section of the SaaS platform to interact and use the software for their own unique needs. Of course, this is also important for security and privacy purposes so that data associated with one business customer is not accessed by another business customer. To this end, data associated with each business customer or account is directed to a separate section of a shared database.

Referring now to FIG. 1, FIG. 1 is an example of a typical architecture of a SaaS application. As shown in FIG. 1, the customer (e.g., a business, sales administrator of a particular business account, etc.) may access the SaaS platform through a mobile phone 120, a web browser 122, an Outlook® browser 124 etc., which connects to a cloud network 110. As shown in FIG. 1, the users all interact with the application through a common user interface 102. However, data associated with each of the customers is stored in a separate section of a shared database 106. For example, 106a refers to a database table unique to customer A, 106b refers to a database table unique to customer B and so on. It should be appreciated that the SaaS application may be used by hundreds of business customers; thus, the same database 106 is used to store and retrieve data for all the business customers, albeit in different sections. This type of SaaS architecture is typically referred to as a multi-tenant model.

In the context of historical trending, the multi-tenant model may pose a problem when a customer wants to run a complex query to retrieve desired historical information about his company. For example, a customer may want to analyze how sales opportunities have changed over time. Given that the same database 106 is used to store information for all the business customers, running a complex query on database table 106A invariably affects the speed and performance of the entire database, and may adversely affect performance for the remaining business customers. Thus, in most cases, most SaaS providers limit historical trending capability to a very simple query, or limit the time for which historical trending may be performed. As a result, customers are unable to successfully leverage data collected over time to analyze historical trends, and thus, may be unable to gain valuable insights on their business performance.

SUMMARY

One or more embodiments of the current application address the above problems by providing an approach to provide historical trending capability to users of a SaaS business platform. In one aspect, a method according to one or more embodiments provides a SaaS platform to a plurality of business accounts. A first business account of the SaaS platform is provided a first server instance having a first database such that the data associated with the first business account is directed to the first database. A second business account of the SaaS platform is provided a second server instance having a second database such that data associated with the second business account is directed to the second database. A historical table is created in the first database. A snapshot of data from one or more database tables of the first database is periodically copied over to the historical table of the first database such that the historical table collects snapshots of data at recurring intervals. Snapshot data is retrieved from the historical table in response to a query using only the first database such that a query of any complexity can be performed.

Further details of aspects, objects, and advantages of embodiments are described below in the detailed description, drawings, and claims. Both the foregoing general description and the following detailed description are examples only and explanatory, and are not intended to be limiting as to the scope of the disclosure.

DETAILED DESCRIPTION

Figure 1:
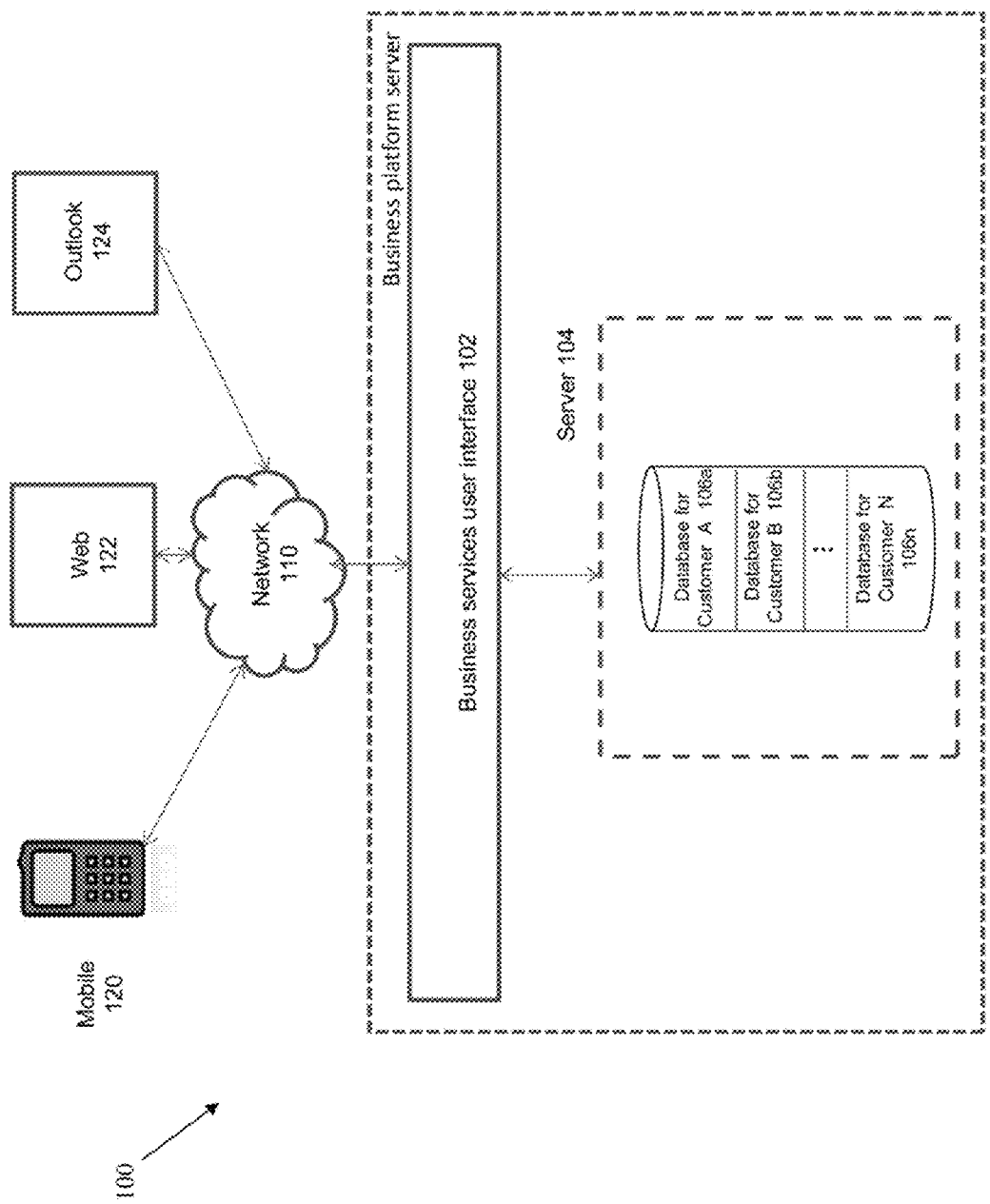
FIG. 1 illustrates a prior art system architecture for a business platform.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention(s) or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of mobile applications that receive additional role and environment information. It is noted, however, that the invention(s) are not limited in its scope to these types of applications and this set of additional information, and indeed, may be applied to other types of applications and information as well.

As noted above, the issue addressed by the present disclosure is that in traditional SaaS applications, historical trending capabilities are either limited or non-existent given the limitations of the traditional multi-tenancy data architecture briefly described with respect to FIG. 1.

More pertinent to the current invention, an alternate system architecture of an SaaS business platform may be more beneficial, especially in the context of providing more advanced historical trending capabilities. Rather than multiple business customers sharing a single database such that activities related to one database table unnecessarily affects or taxes the remaining database tables associated with other business accounts, each business customer (or business account) is assigned its own dedicated server instance and a dedicated database that is unique to that particular business customer. This model is typically referred to as a virtual tenant model. The virtual tenant model gives the business customer more flexibility and control over the data generated and managed at the SaaS application, and is especially advantageous when it comes to historical trending and analysis capabilities.

Although the SaaS business platform may be related to any business, historical trending may be especially relevant to sales teams at various businesses. For example, sales representatives may use enterprise software provided through a SaaS business platform to record or update sales numbers, generated revenue, potential revenue, actual revenue, missed, sales opportunities, missed opportunities, sales activities and other such information. The sales rep may be interested in identifying changes in their sales pipeline, forecasting data, lead management, etc. The ability to track, store and report on historical changes may be directly related to the performance of the sales rep. Historical trending in such a business platform may allow sales reps more flexibility to quickly analyze past sales records and opportunities, which in turn may affect their sales performance, and ultimately revenue generated by the sales rep, and the company at large.

Figure 2:
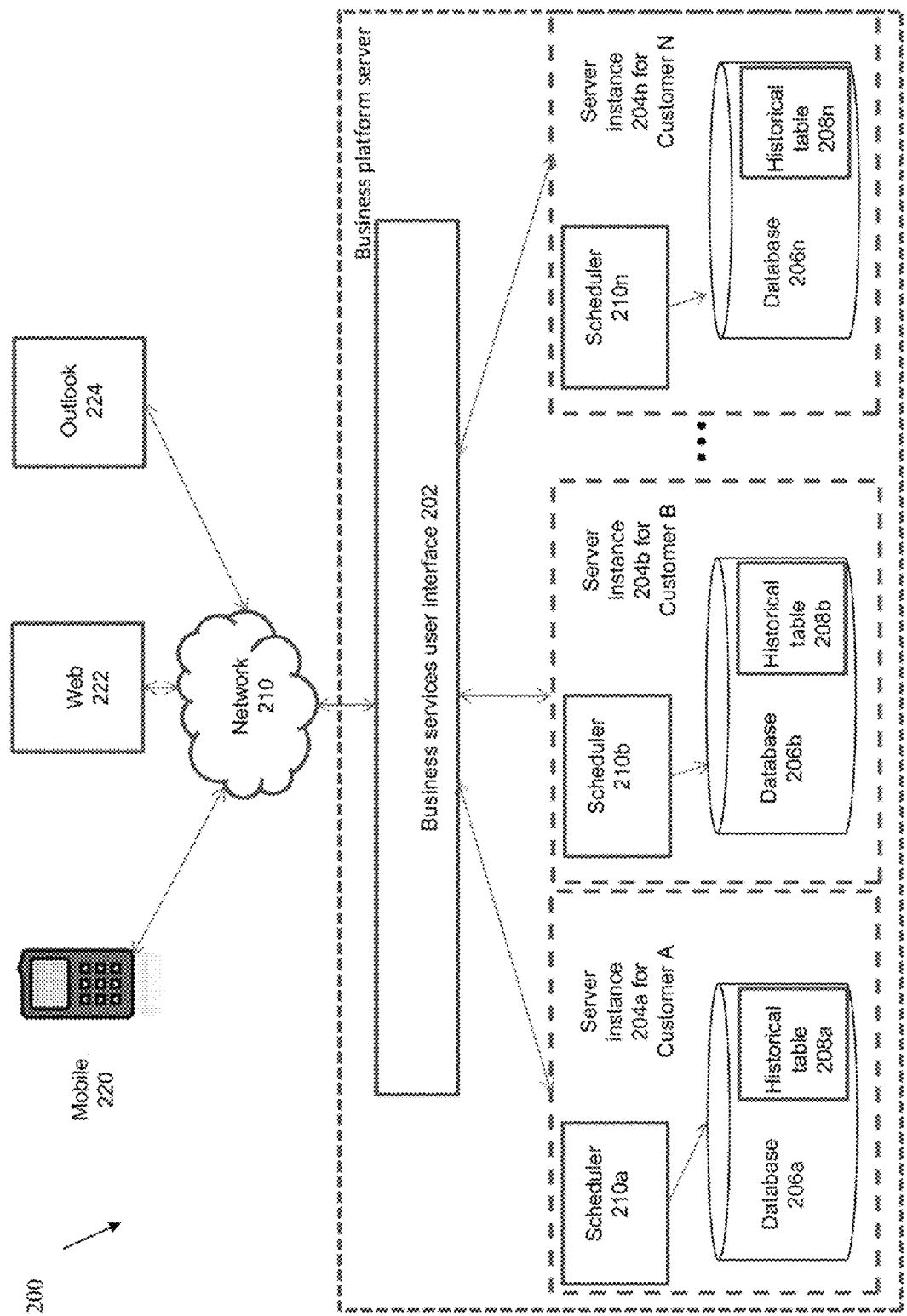
FIG. 2 illustrates a system architecture for implementing historical trending according to one or more embodiments.

Referring now to FIG. 2, similar to FIG. 1, one or more users associated with one or more business accounts may access and interact with the business platform (system 200) through a mobile phone 220 (e.g., smartphone, etc.), a secure web browser 222, an Outlook® browser, etc. Or, in other embodiments, tablet devices may be similarly used to access and interact with the business platform. The tablet device may comprise any type of portable device, including for example, tablet computers, portable readers, PDAs, etc. The mobile telephone device may comprise any mobile device that can suitably access an application on application server, such as smartphones and programmable mobile handsets. It should be appreciated that the above three devices/browsers are mentioned for example purposes only, and other devices/browsers etc. may be similarly used.

Similar to FIG. 1, users interact with the business platform through a common business services user interface 202. As mentioned previously, the user interface 202 may require authentication information (e.g., a login/sign-in screen, a registration screen, etc.) from the user before granting access to the business platform. After the user has been authenticated, the user may be directed to the customer account he/she may be associated with. It should be appreciated that each business customer may be associated with a business customer account. However, multiple users of the same business may access the same business account with their own unique login information. For example, a small business ABC may have a business account with the SaaS application. ABC may have 8 sales reps, 2 sales managers and a Vice President. All 11 employees may be able to access the SaaS application and the business account for ABC through their own individual logins.

However, in contrast to the multi-tenant model, rather than all the business accounts sharing the same database 106, as shown in FIG. 1, in the virtual tenant model, data associated with each business account or customer (e.g., company ABC in the example above) is directed to a separate server instance 204 (e.g., server intances 204a, 204b, etc.) within the architecture of the SaaS application, as shown in FIG. 2. Each individual server instance 204 hosts a database 206 such that data associated with that business account is exclusively directed to that particular database. The database 206 corresponds to any type of computer readable mediums or storage devices. The computer readable storage devices may comprise any combination of hardware and software that allows for ready access to the data within database. For example, the computer readable storage device could be implemented as computer memory or disk drives operatively managed by an operating system. Database 206 may comprise backend systems containing authentication data for authenticating usernames and passwords, role configuration data for a plurality of roles, and environment mapping data that maps environments to database resources associated with the environment. For simplicity, database 206 is illustrated as a single database for each server associated with each business account, but it should be understood that each database 206 (e.g., database 206a, database 206b, etc.) may comprise a plurality of databases. In addition, each database 206 may comprise backend logic servers or database middleware that processes and manipulates data that is sent to or received from server instance 204.

Thus, as described above, data associated with the account is properly channeled and stored in the appropriate database. It can be appreciated that this system architecture of the SaaS application or business platform immediately allows for more efficient data storage that does not interfere with data associated with other customer accounts also hosted by the business platform.

Specifically, to allow for historical trending capability, the server instance 204 may also include a scheduler (e.g., scheduler 210a, scheduler 210b, etc.) to schedule a copying job at which data from the database 206 dedicated to a particular business account is copied and moved to a historical table (e.g., historical table 208a, historical table 208b, etc.). Thus, the historical table collects data desired by the customer at intervals desired by the customer such that it can be easily queried for historical trending and analysis purposes, as will be described in more detail further below.

It should be appreciated that transferring or copying relevant data from one or more database tables of the database 206 to a historical table provides an easily accessible location specific to the business account that can be conveniently queried to retrieve historical trending information as needed. In the preferred embodiment, historical trending may be performed on either standard objects or custom objects.

Figure 3:
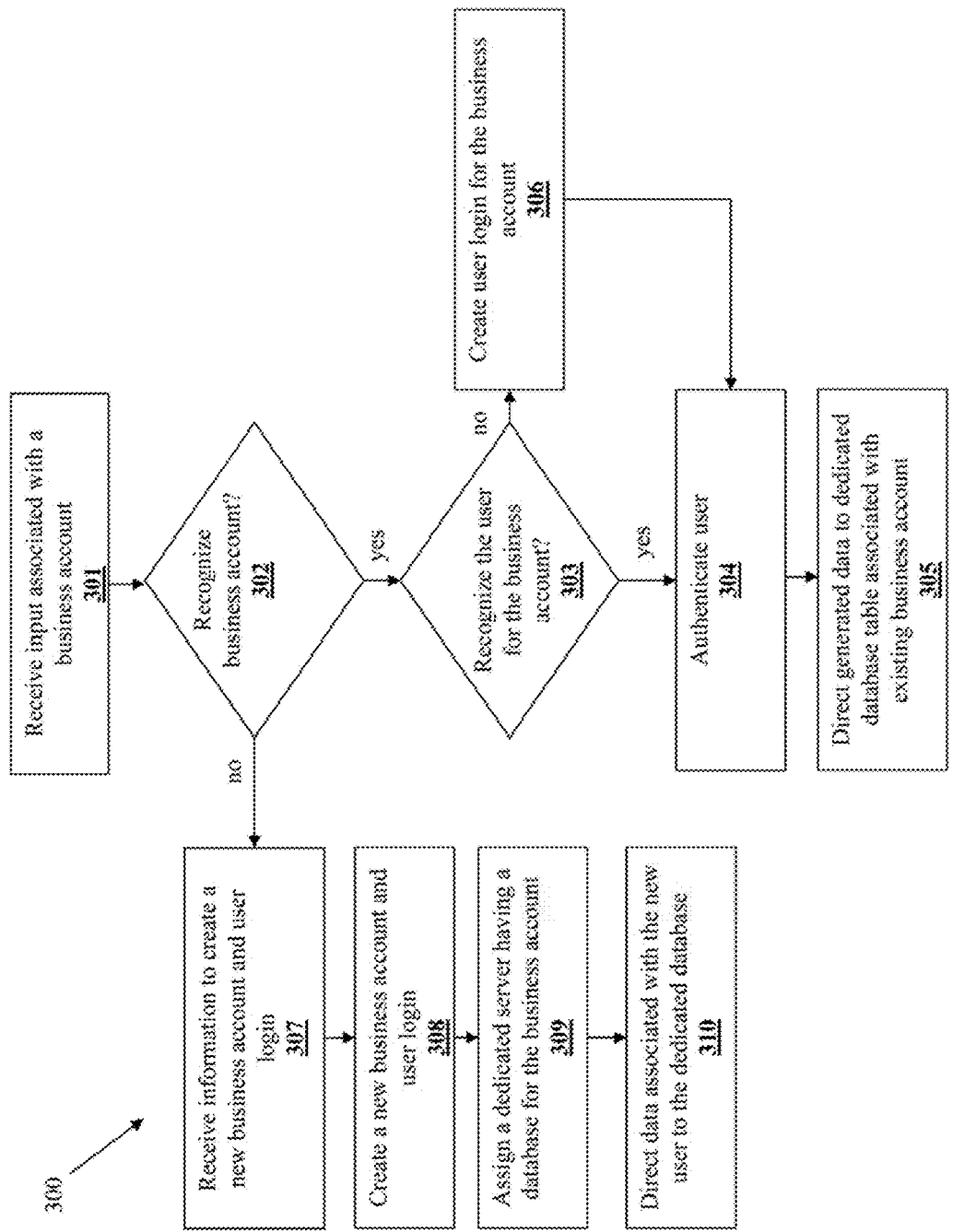
FIG. 3 illustrates a flowchart of an approach for implementing the system architecture of FIG. 2 according to one or more embodiments.

Referring now to the flowchart of FIG. 3, an example method 300 is illustrated. During 301, the system 200 receives input associated with a business account. For example, an existing user may enter login information through the user interface. Or, a new user or administrator may register for the SaaS and provide basic information. Or, the user may enter identifying information about the business account and then be taken to a user login screen. It should be appreciated that the above approaches are only examples, and many other similar approaches may be used. Based on the received input, at 302, the system 200 determines if a business account is recognized.

If the business account is recognized, at 303, the system 200 determines if the particular user is recognized. For example, the business account may exist, but the user may not be authenticated. Or, the user may not yet have an account. At 304, if the user has an existing user login to the business account, the system 200 may authenticate the user. For example, the user may login through a recognized username and password, and the system 200 may authenticate the user. In some embodiments, the system 200 may check the authentication data for the user at the backend system in a separate database (not shown) to authenticate the user.

At 305, once the user has logged in, and begins using the SaaS application, any data generated through the session is directed to a dedicated database associated with a server instance specific to the business account. For example, the user may enter information about his/her latest sales numbers or opportunities. This information may be stored in the dedicated database. It should be appreciated that the database 206 has one or more database tables. For example, a user of the business account may have one or more database table storing information specific to that user.

At 306, if the user is authenticated for the business account (e.g., by legitimate email address, identification information, etc.), but is a first-time user, the system 200 may create a user login for the user. Once the user login is created, the system 200 authenticates the user at 304, and any generated data is directed to the dedicated database (or database table) at 305, as described above.

If, at 302, the system 200 does not recognize the business account, the system 200 requests more information about the business account and the user (step 303). For example, the system 200 may request details about the business (e.g., number of required user logins, payment information, subscription information, etc.). Based on the received information, the system 200, at 308 creates a new business account. It should be appreciated that the business account is typically one for an entire business, and may have multiple users logging into the same business account. This is important for privacy and security of the information stored at the SaaS platform. For example, following the example of company ABC described above, the privileges (or role) of the sales manager may be different than that of the sales rep. The privileges of various employees of a company may be predetermined by a system administrator of the business account when setting up the system 200, in one embodiment. The sales manager may have greater access to existing data associated with the business account than what the sales representative, in one instance. Thus, multiple users have different roles within a company can efficiently access and interact with the system 200 within a single business account. In addition to creating the new business account, the system 200, at 308 may also create a user login for the user as well.

Next, at 309, when the new business account is created, the system 200 may assign a separate server instance to the new business account in order to save all data associated with all users of the business account in a dedicated database within the separate server instance. At 310, once the new user starts using the SaaS application and generates data, all the generated data is directed to the newly assigned dedicated database.

As described above, the architecture outlined above facilitates independent storage and retrieval of data because each business account is assigned a dedicated server instance 204 and database 206. Additionally, the SaaS business platform specifically enables a historical trending capability by periodically copying data from one or more database tables of the database 206 to a historical table in the database 206 from which historical trending data may be easily retrieved for analysis purposes. Additionally, in doing so, the business platform allows greater flexibility in what data is transferred and retained in the historical table, what data is deleted or "cleaned up", and when the data is transferred over to the historical table from the database table. It should be appreciated that the historical table is a stored within the dedicated database, as shown in FIG. 2. In one embodiment, the historical table may be specific to each user of the business account. Or, in another embodiment, the historical table may be a shared historical table holding data from some or all users of the business account.

Figure 4:
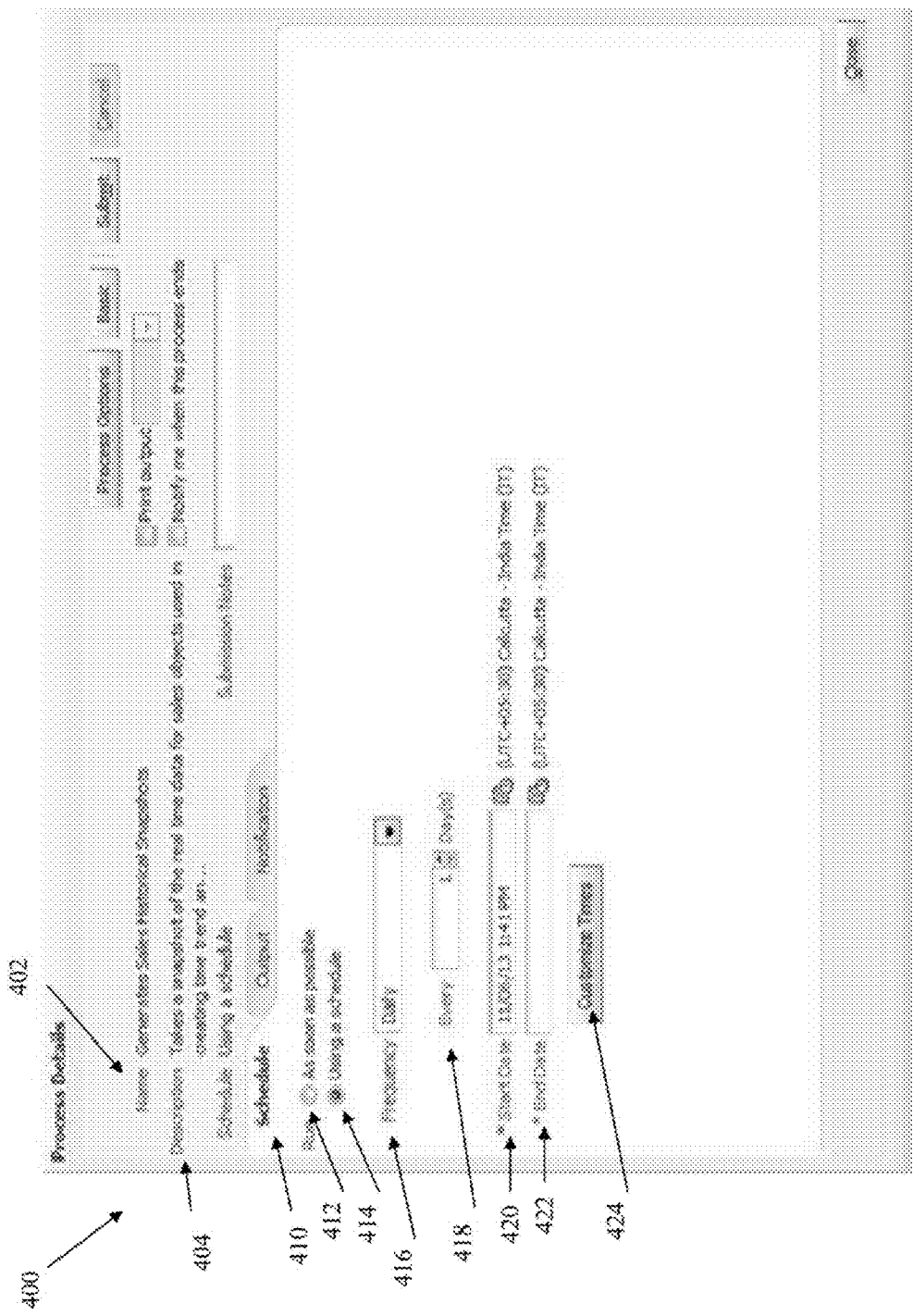
FIG. 4 illustrates an example user interface for setting up configuration parameters for creating a historical table according to one or more embodiments.

To best tailor the data stored in the historical table to the needs of the business, the system 200 is configured to receive input from the user (e.g., a system administrator, etc.) in order to schedule a time at which data is periodically copied from the relevant database table to the historical table. Referring now to FIG. 4, FIG. 4 illustrates an example user interface during the set-up process. The set-up process is typically performed when the business account is first created with the SaaS business platform. However, it should be appreciated that the set-up parameters may be similarly edited or updated after the initial set-up process.

FIG. 4 is an example embodiment of a user interface of the business platform during set-up. A set-up screen 400 may be generated to allow a user to select parameters associated with historical trending. Similar programming screens may be generated for other aspects of the business platform as well.

In the illustrated embodiment, the set-up screen 400 allows the user to select a name for the scheduling process. It should be appreciated that the user may schedule multiple scheduled jobs at which to transfer different sets of data from one database table to the historical table. FIG. 4 illustrates one such scheduling process. The illustrated embodiment shows a name field 402 which defines the name of the scheduling job. In the illustrated embodiment, the name of the process is "Generates Sales Historical Snapshots." Other names for other scheduled process may be similarly used. For example, the user may have a separate scheduled job for revenue amounts to track the change in revenue over time. The illustrated embodiment of the set-up screen 400 also comprises a description field 404 which provides a description of what the scheduling process is for.

In the illustrated embodiment, the schedule tab 410 has been opened. As shown in FIG. 4, the schedule tab 410 allows the user to select various parameters on scheduling the process of copying data from a database table 206 to the historical table. There may be options of when the schedule job is to take place. The schedule process may be programmed to start "as soon as possible," as shown in control 412, or may be programmed to start "using a schedule," as shown in control 414. In the illustrated embodiment, control 414 has been selected, as indicated by the darkened button icon.

The set-up screen then allows the user to select the time and frequency of the process. As shown in the illustrated embodiment of the set-up screen 400, the user may indicate the frequency at which snapshots of data are copied from a particular database table of the database 206 to the historical table using the "Frequency" field 416. The frequency may be daily, bi-weekly, weekly, monthly, or any frequency desired by the user. In the illustrated embodiment, a "daily" frequency has been selected as shown in field 416.

It should be appreciated that different businesses may desire different granularities at which a snapshot of the data is copied over from a database table of the database to the historical table. For example, some businesses may not be interested in data collected daily, and may instead be only concerned with quarterly reports. This may especially be true in the case of big companies that accumulate a lot of data and sales figures, and monthly reports may be sufficient for historical trending purposes. On the other hand, other business may want to generate historical reports with greater granularity. For example, smaller companies may want to analyze their sales figures with greater precision, and may want to analyze daily trends in data. The user can be more specific by using the "every" field 418 to define how often the snapshot data is transferred. Thus, if the user does not desire daily granularity, but would rather collect data every 2 days, the user can define "2" in the "every" field 418. Thus, the set-up screen 400 is configured to give users flexibility in the frequency at which snapshot data is collected and retained.

The set-up screen 400 also comprises a start date field 420 and end date field 422 that are configurable by the user to define start dates and end dates for each schedule process. For example, the system administrator for the business may want to program multiple schedule processes depending on the time of year, or level of business activity. For example, the user may desire higher granularity of data to be copied over to the historical data closer to release of a product, and may require lower granularity for all other times of the year. Once the user has selected the desired parameters, the user may select the "Customize Times" button 424 to complete the set-up of the particular programming (in this case, generating historical snapshots). Thus, a programming screen such as 400 gives the user ample flexibility to select parameters associated with the data copied over to the historical table.

Also, it should be appreciated that the program screen 400 may also allow the user to specifically select the time of day at which the data is copied over from a particular database table to the historical table (not shown). Thus, the user not only chooses the frequency at which data is copied over to the historical table, but also is in control of when the data gets transferred.

For example, assuming the frequency of copying over data is selected to be "daily" in frequency field 416 of screen 400, the user may further be allowed to select what time of day the copy takes place. This may be a crucial feature for many businesses because the daily sales pattern may not be the same for all types of businesses, and allowing the customer to select the time of day enables the customer to control the data more efficiently. For example, online businesses may see sales throughout the day, and may be less concerned about the time of day the data gets copied from the database table to the historical table, but a business that has a physical location may be most concerned about end-of-day sales figures. Thus, the latter may be able to select a time of, say 6 PM daily, as the time at which data is copied over, for example. The above outlined configuration features give the customer more control over the data collected in the historical data, which in turn makes the data more useful and efficient when analyzing it at a later time.

Figure 5:
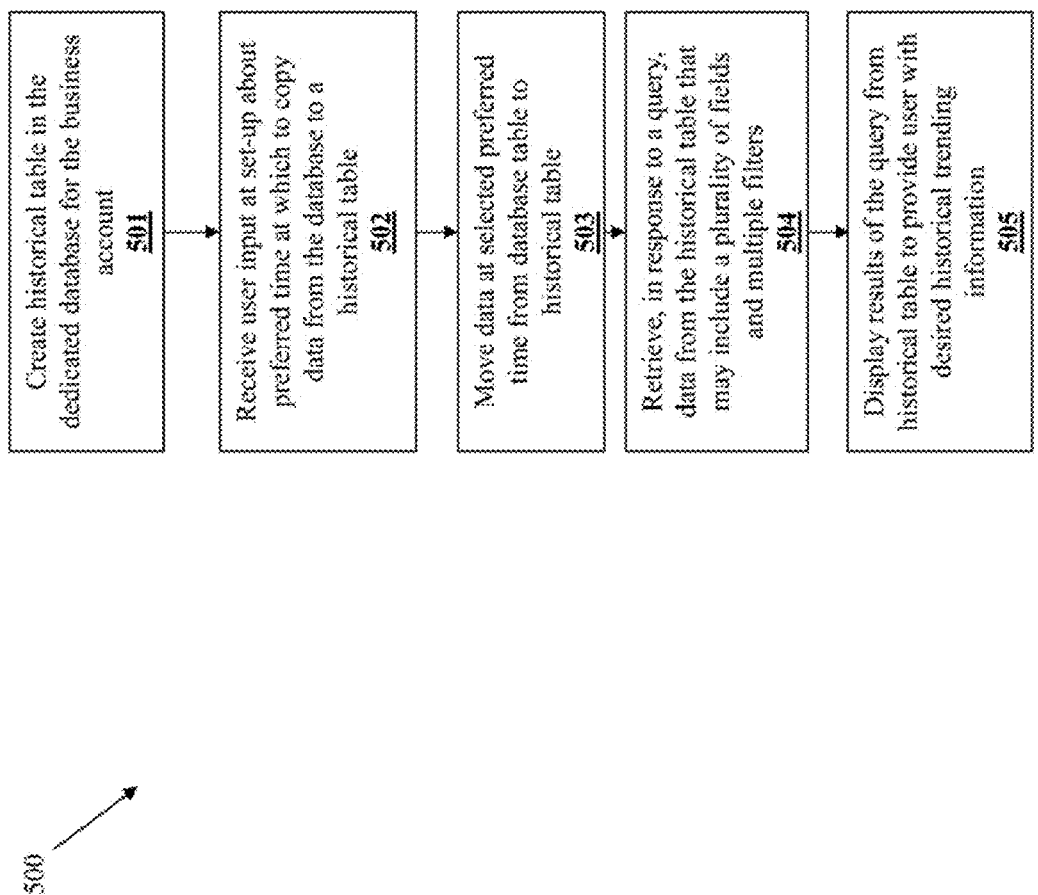
FIG. 5 illustrates a flowchart of actions taken by a business platform to track snapshots of data according to one or more embodiments.

Referring now to FIG. 5, an example method 500 for configuring parameters associated with the historical table will now be described. At 501, a historical table is created within the database 206 for each business account that periodically collects data to be used for historical trending purposes. At 502, the system 200, during a configuration process (which may initially be during set-up, or later to update configuration settings) may receive user input associated with data to be periodically copied to the historical table. For example, the system 200 may receive input about the frequency and time of day at which data is copied from the database to the historical table.

At 503, the system 200, at the selected preferred time copies a snapshot of the preferred data from the database to the historical table, and stores it in the historical table. As discussed previously, the user maintains control of what type of data, the frequency of data and time at which data is routinely collected in the historical table.

At 504, the system 200 may, in response to a query submitted by a user, retrieve data from the historical table. It should be appreciated that because the system 200 operates in a virtual tenant model, the query submitted by the user can be a complex query that includes multiple filters. In one embodiment, the query may retrieve data stored in the historical table for about 15 months. Or, in another embodiment, the query may be an advanced query that may encompass up to 700 fields. It should be appreciated that the above time limits are examplesonly, and records for longer duration may be queried, or the query may support a higher number of fields. Since each business account is assigned its own separate database and server instance, the user is able to form a much more complex query to retrieve data from the historical table as desired by the user. Typically, given the constraints of the system architecture in the case of multi-tenant models, multi-tenant systems can only accommodate simple queries defining only up to 4 fields, or may only retrieve data for up to 4 months, in some cases. Thus, the virtual tenant model gives the user more control in retrieving the desired data, which in turn allows the user more accurate visibility about historical data associated with the business. It can be appreciated that the virtual tenant model allows the user to perform more complex analysis on collected data, rather than what would be possible in a multi-tenant model. At 504, the results of the query are displayed to the user through the user interface.

Figure 6:
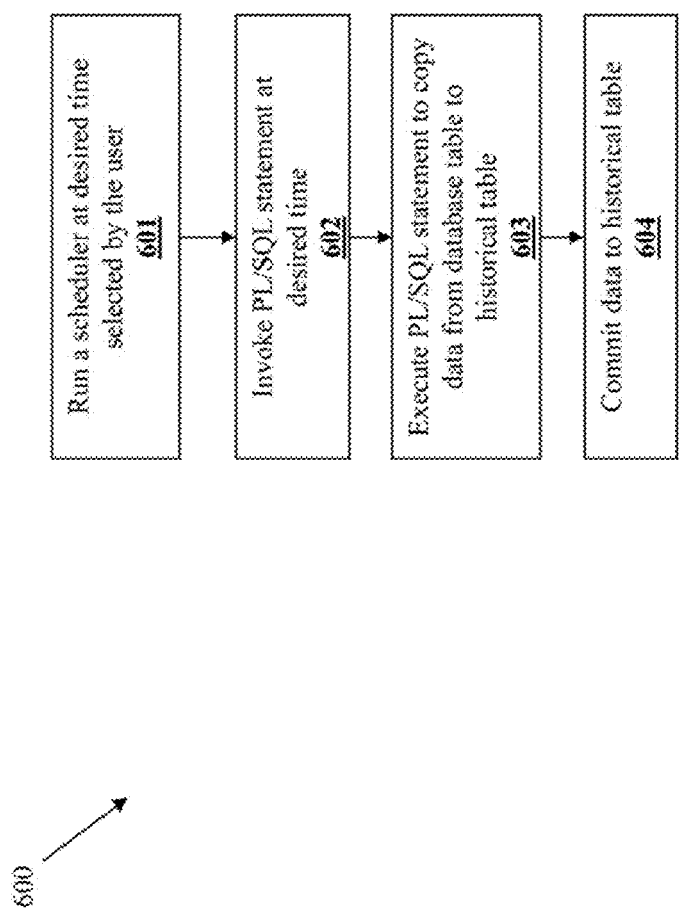
FIG. 6 illustrates a flowchart of actions taken to schedule a copying task from one or more database tables to the historical table according to one or more embodiments.

Referring now to FIG. 6, an example method 600 for copying a snapshot of the data from the database to the historical table using the system 200 will now be described. It should be appreciated that the user or system administrator may have already gone through the set-up screen 400 to define the set of preferences for the system, including copying snapshot data to the historical table. At 601, based on the defined time, the system 200 may run a scheduler 210 (e.g., 210*a*, 210*b*, etc., as shown in FIG. 2). The scheduler 210 is configured to invoke, at the predetermined time, the programming code that performs the scheduled task. At 602, the scheduler invokes a PL/SQL statement at the scheduled time. At 603, the PL/SQL statement is executed, which copies the desired data from a particular database table to the historical table. At 604, the data is committed to the historical table.

In addition to enabling the user to configure settings related to scheduling the copy of the snapshot data from a particular database table to the historical table, the set-up screen 400 may also enable the user to configure settings related to clean-up of data stored in the historical table (not shown). For example, at the set-up screen 400 the user or system administrator may be presented with a set of options associated with clean-up of data. Although data collected at a daily granularity may be beneficial for historical trending and analytics purposes when the data is being examined within a few weeks or a few months, daily data may cease to be helpful when the time period is greater. For example, assuming a business has been collecting data for more than a year, the user may then only be interested in weekly granularity or monthly granularity. Thus, the user at the set-up screen 400 may select one or more clean-up parameters that define how data may be cleaned-up from the historical table. For the historical table to be beneficial for the user of the business account, the data stored in the historical data must be current and only retain necessary information, and must systematically eliminate unnecessary or redundant information. However, rather than automatically cleaning-up data based on system-set default settings, the system 200 allows the user to define the settings to retain and eliminate data based on the user's needs.

The set-up screen 400 may include clean-up preferences including, but not limited to the type of the snap-shot data to be cleaned up, date of clean-up, frequency of snapshot data to be cleaned up, and other clean-up parameters. It should be appreciated that the time of clean-up of data from the historical data may also be defined by the user. For example, clean-up of data may occur every time a snapshot of data is copied over to the historical table. Or, the clean-up may be scheduled to occur only once a month, in one embodiment. Or, the clean-up may be quarterly, etc. Thus, as described above, the set-up screen 400 gives the user flexibility and control on how data is both retained and eliminated from the historical table, thereby making it more efficient and helpful to the users of the business account.

Figure 7:
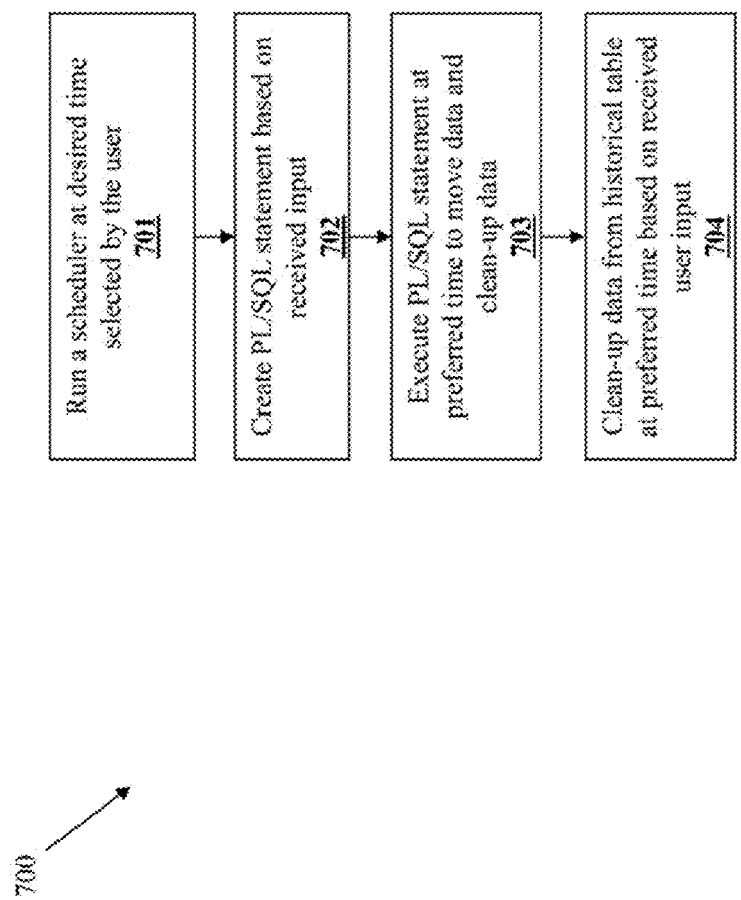
FIG. 7 illustrates a flowchart of actions taken to schedule a clean-up task of the historical table according to one or more embodiments.

Referring now to FIG. 7, an example method 700 for periodic clean-up of data from the historical data using the system 200 will now be described. It should be appreciated that the user or system administrator may have already gone through the set-up screen 400 to define the set of preferences for the system, including preferences associate with clean-up of the historical table. It should be appreciated, and as mentioned previously, that the system administrator also defines a time at which the clean-up is scheduled. At 701, based on the defined time, the system 200 may run a scheduler 210 (e.g., 210*a*, 210*b*, etc., as shown in FIG. 2). The scheduler 210 is configured to invoke, at the predetermined time, the programming code that performs the scheduled task, which is the clean-up of the historical table, in this case. At 702, the scheduler invokes a PL/SQL statement at the scheduled time. The PL/SQL statement contains programming code associated with the scheduled clean-up, including clean-up parameters defined at the set-up screen 400. At 703, the PL/SQL statement is executed, which cleans up the data desired to be cleaned up from the historical table. At 704, the remaining data is committed to the historical table.

As mentioned previously, the virtual tenant model of the system architecture shown in FIG. 2 ensures that each business account of the SaaS business platform has a dedicated database and server instance, which in turn, greater facilitates and enhances historical trending capabilities that are typically a challenge to provide in multi-tenant models. Rather than providing customers with limited historical analytics and trending capabilities, the virtual tenant model allows customers to create detailed and complex queries with multiple filters. Also, the historical table may support an advanced query in up to 700 fields rather than a limited advanced query functionality typical for most multi-tenant systems.

When a user of a business account wants to query the historical table to analyze historical trends, the user may simply form a query through the user-interface. As described above, the query may be a simple query or an advanced query. A simple query may comprise a query specifying rules for one or two fields of the historical table, for example. An advanced query may comprise multiple filters, and define rules for many fields of the historical table. In response to the received query, the system 200 executes the query on the data stored in the historical table and retrieves the data based on the query. Since each business account is associated with its own dedicated database 206, queries can be efficiently run on the database 206 without slowing down other customers of the SaaS business platform. This key functionality allows the user to create advanced historical trending reports and perform various types of analytics on historical data.

Figure 8A:
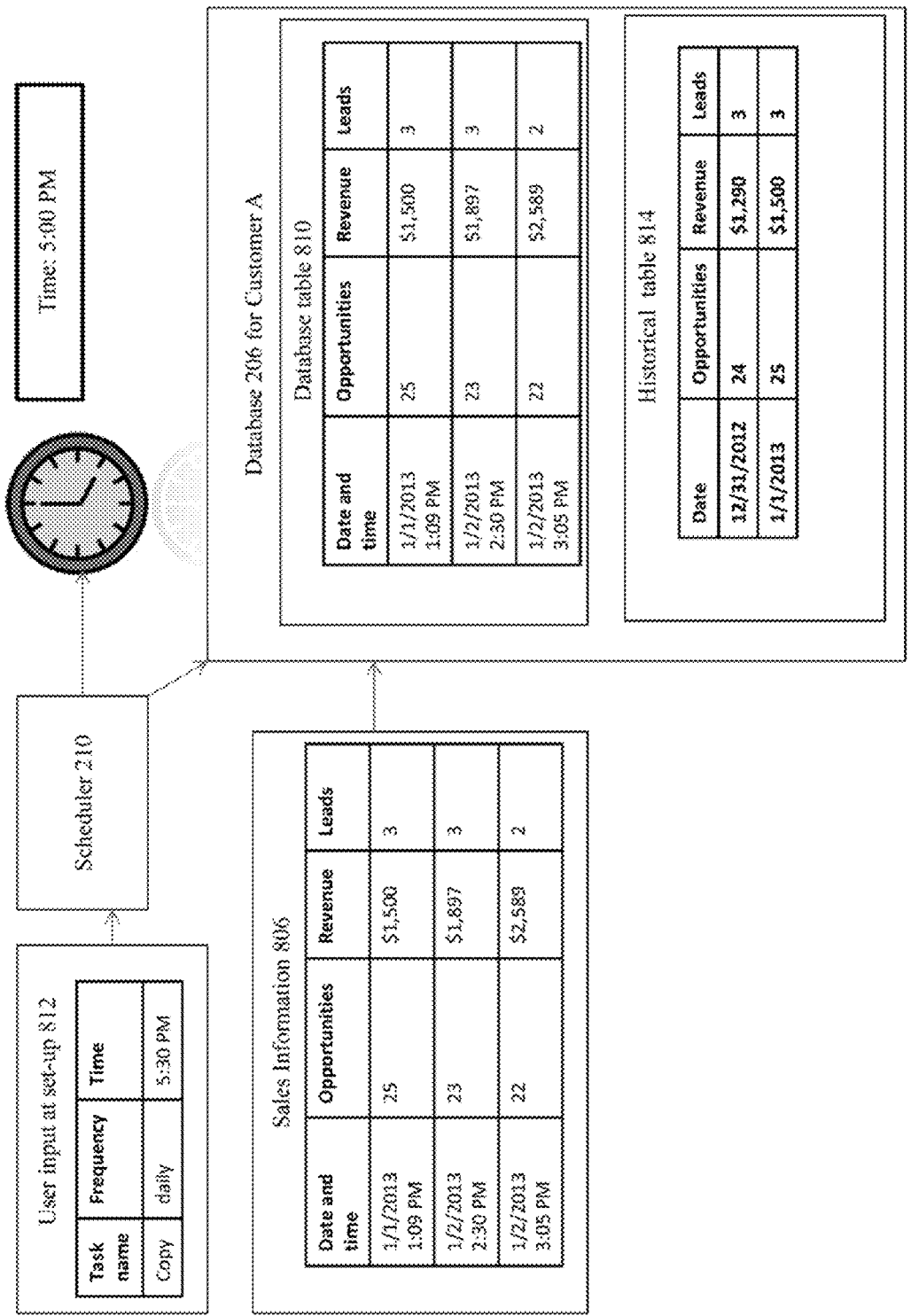
FIG. 8A-8C illustrate a process flow of scheduling a copying task to the historical table according to one or more embodiments.
Figure 8B:
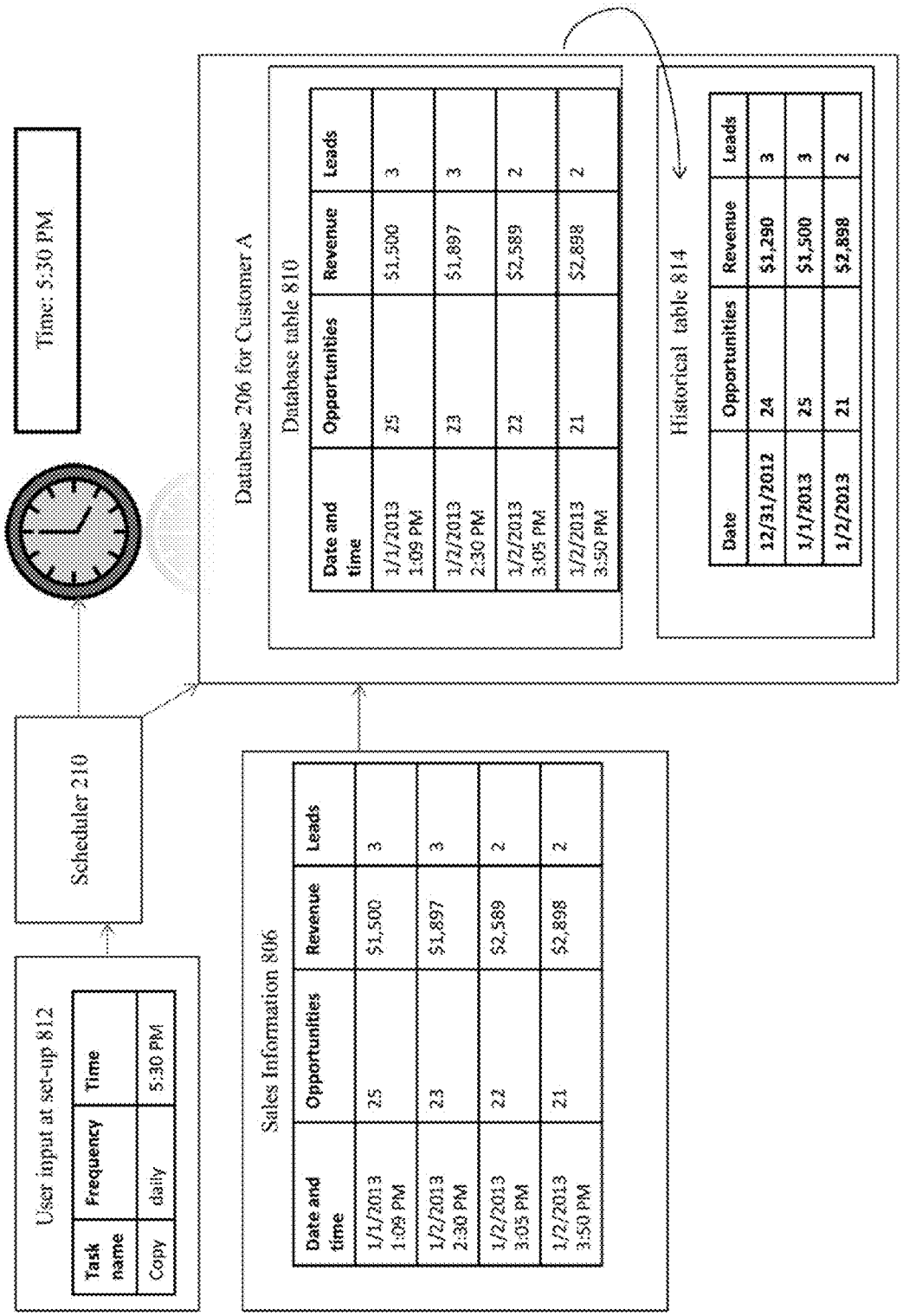
Figure 8C:
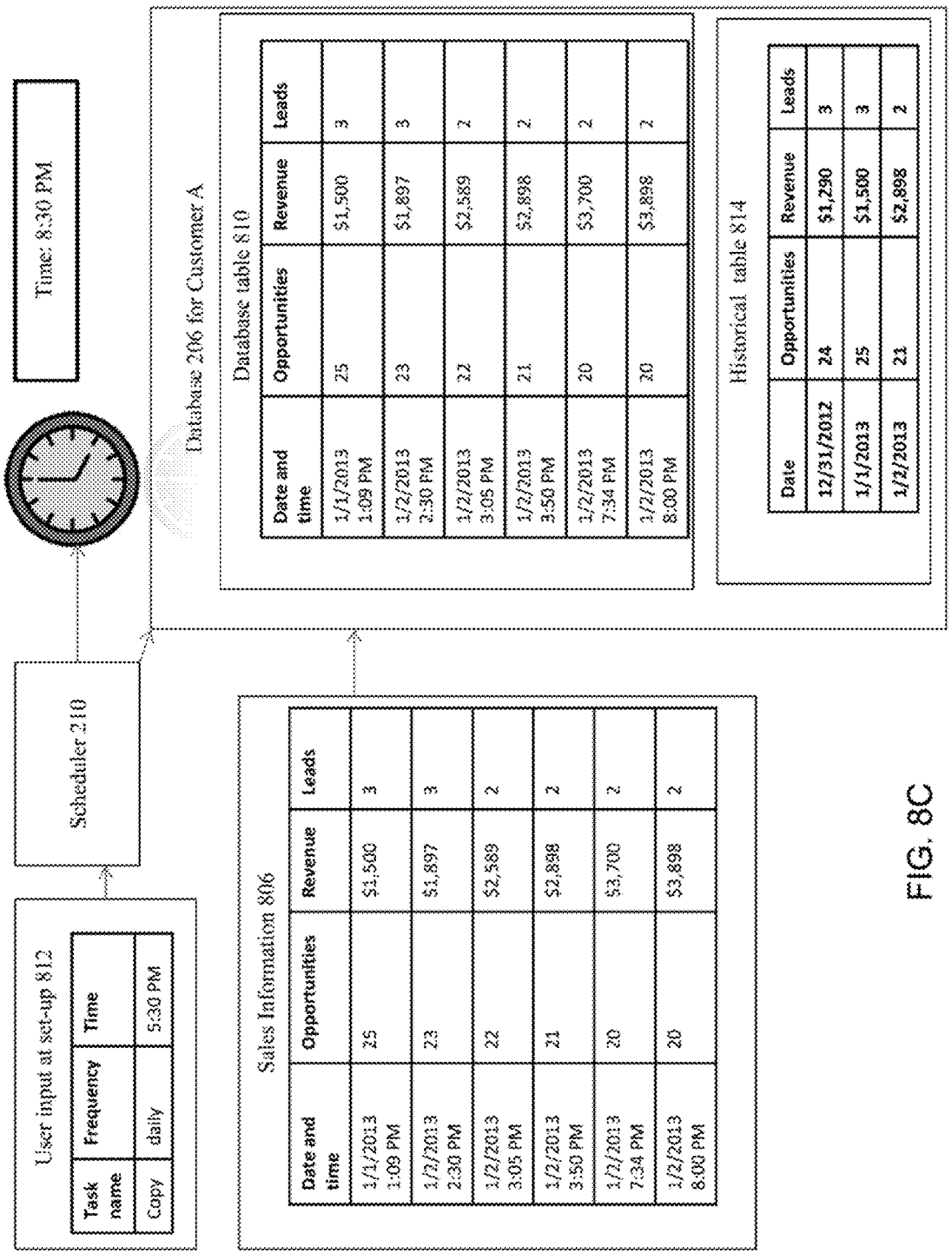

FIGS. 8A-8C illustrate an example of periodically copying snapshot data from one or more database tables to the historical table. In the illustrated embodiment, user input has already been received at a set-up screen 812. The set-up screen allows the user to configure one or more options regarding snapshot data, including a time at which to move over the snapshot data from one or more database tables to the historical table, clean-up of data from the historical table, etc. Here, as per the user-input received at set-up 812, the copy function (i.e., copying snapshot data from one or more database tables to the historical table) is configured to take place daily at 5:30 PM, as denoted in the "frequency" and "time columns of set-up 812. This user-input received at set-up is directed to the scheduler 210 that programs the copy task at the desired periodicity (i.e., frequency and time).

Here, in the illustrated embodiment of FIG. 8A, the date is Jan. 2, 2013, and the time is currently 5:00 PM. The sales information table 806 represents sales data being entered into the system as the day progresses. Table 806 shows various sales transactions that occurred throughout the day.

The sales information is directed to database 206 that is exclusively associated with Customer A, and is stored in database table 810. It should be appreciated, as mentioned previously, that each dedicated database may have multiple database tables similar to that shown in table 810. Table 810 shows various entries relating to business data accumulated throughout time). Each row has a plurality of fields, and is marked with a timestamp that denotes the time at which the data entry was entered into the database table.

The database 206 also includes a historical table 814, as shown in FIG. 8A. In the illustrated embodiment, the historical table contains snapshots of data from Dec. 31, 2012 and Jan. 1, 2013. The snapshot data for Jan. 1, 2013 as stored in the historical table 814 is the last entry for Jan. 1, 2013 before 5:30 PM. Here, as per database 206, the last entry for Jan. 1, 2013 before 5:30 PM was copied over as the daily snapshot into the historical table.

Referring now to FIG. 8B, the time is now 5:30 PM, which is the time at which data is scheduled to be moved over from the database table 810 to the historical table 814. As described above, the scheduler 210, schedules a copy job at the desired time to copy the most recent snapshot data from the database table 810 to the historical table 814. Here, the most recent data before 5:30 PM (at 3:50 PM) is copied over to the historical table and stored as the daily snapshot data in the historical table 814. The previous entries for the same day (Jan. 2, 2013) are not copied over, as shown in the illustrated embodiment.

Referring now to FIG. 8C, the time is now 8:30 PM, and more data is stored in the database table since the snapshot data was moved over at 5:30 PM. The database 206 includes entries with timestamps of 7:34 PM and 8:00 PM, but these entries are not copied over to the historical table 814. Only the last entry for the day entered before the scheduled copy job is copied over to the historical table. Thus, rather than storing unnecessary information that may not be relevant in the long term, the system simply stores snapshot data at a predetermined frequency to be retrieved later for historical trending purposes.

Therefore, the present disclosure has provided a new approach for implementing a historical trending solution that allows for more complex and accurate historical trends reporting, and provides customers with greater flexibility throughout the process.

System Architecture Overview

Figure 9:
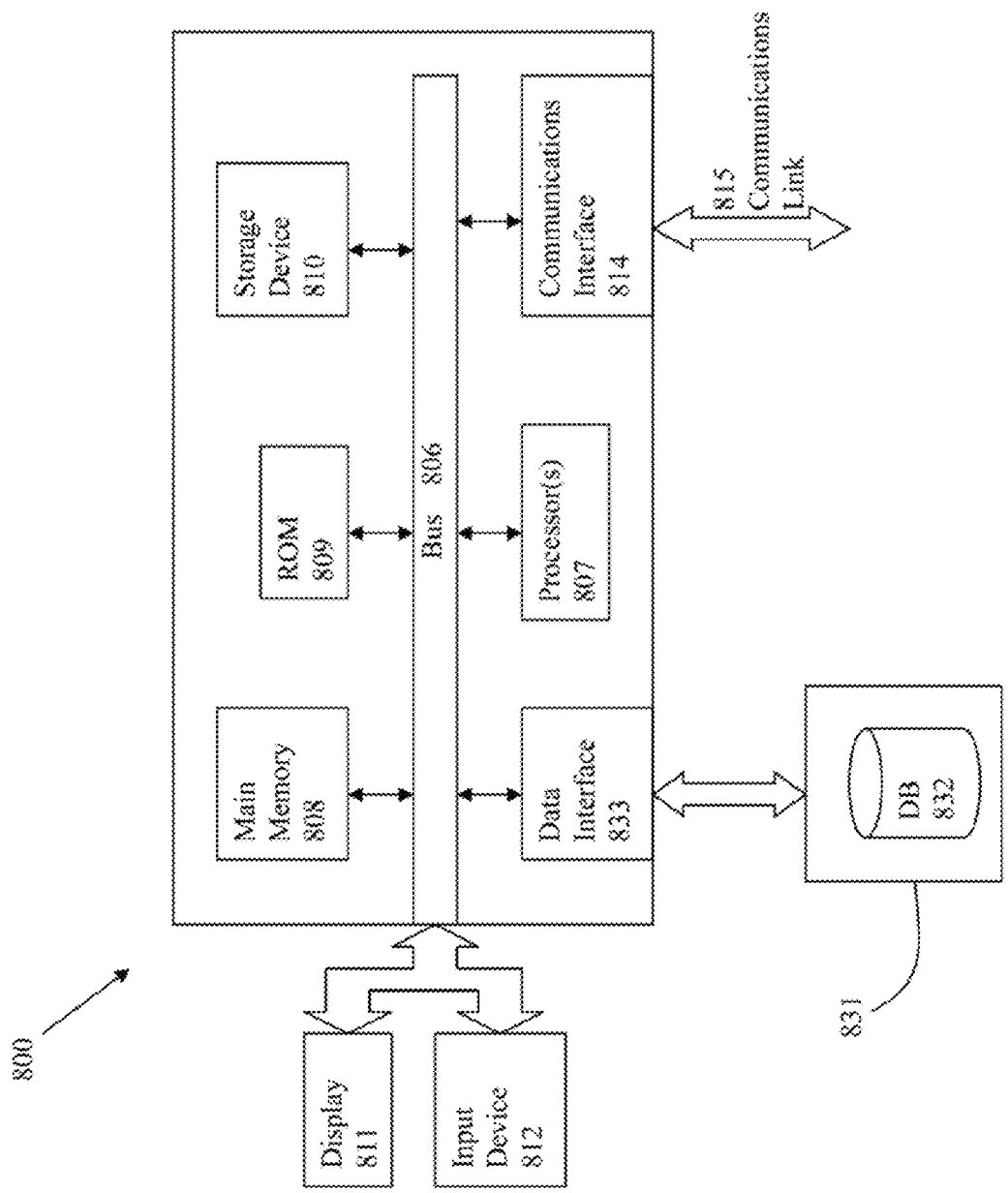
FIG. 9 depicts a computerized system on which an embodiment can be implemented.

FIG. 9 is a block diagram of an illustrative computing system 800 suitable for implementing an embodiment of the present invention. Computer system 800 includes a bus 1706 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to one embodiment of the invention, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the invention. Thus, embodiments of the invention(s)are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention(s) areperformed by a single computer system 800. According to other embodiments of the invention, two or more computer systems 800 coupled by communication link 815 (e.g., LAN, PTSN, or wireless network) may perform the sequence of instructions required to practice the invention(s) in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution.

In the foregoing specification, the invention(s) have been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   providing an interface of a software as a service (SaaS) platform to a plurality of customers associated with a plurality of SaaS platform accounts;
   providing a first server instance within the SaaS platform to a first account, the first server instance being provided to a single account comprising the first account and having a first database;
providing a second server instance within the SaaS platform to a second account, the second server instance being provided to a different account comprising the second account and having a second database;
creating a historical table in the first database of the first server instance within the SaaS platform;
copying a snapshot of data from one or more database tables of the first database to the historical table of the first database, the historical table comprising a plurality of snapshots of data from the one or more database tables copied at different times; and
retrieving, in response to a query associated with the first account, data corresponding to a plurality of snapshots from the historical table using the first server instance and the first database but not using the second server instance and not the second database, wherein access of data in the historical table does not interfere with access to data in the second database.

2. The method of claim 1, further comprising receiving a user provided input corresponding to a time value at which to clean up the snapshot of data from the one or more database tables stored in the historical table, wherein clean-up occurs at a frequency defined by the time value and the clean-up is completed according to a set of parameters received from a user that define how data is to be cleaned-up from the historical table.

3. The method of claim 1, further comprising:
receiving a user provided input corresponding to a time value at which to copy the snapshot of data from the one or more database tables to a corresponding historical table, wherein the historical table collects snapshots of the data at a frequency defined by the time value.

4. The method of claim 3, wherein the frequency defined by the time value is at least one of a daily time value, a weekly time value, a monthly time value, a quarterly time value or a yearly time value.

5. The method of claim 1, wherein the first account is accessed by multiple users associated with the first account.

6. The method of claim 1, wherein a display of data to a user associated with the first account is based at least in part on a defined role value.

7. The method of claim 1, wherein the query is an SQL statement comprising one or more query object parameters.

8. The method of claim 7, wherein the query object parameter is a time period parameter.

9. A computer program product embodied in a non-transitory computer readable medium, the computer readable medium having stored thereon a sequence of instructions which, when executed by a processor causes the processor to execute a method to collect historical data over time, the method comprising:
providing an interface of a software as a service (SaaS) platform to a plurality of customers associated with a plurality of SaaS platform accounts;
providing a first server instance within the SaaS platform, to a first account, the first server instance being provided to a single account comprising the first account and having a first database;
providing a second server instance within the SaaS platform to a second account, the second server instance being provided to a different account comprising the second account and having a second database;
creating a historical table in the first database of the first server instance within the SaaS platform;
copying a snapshot of data from one or more database tables of the first database to the historical table of the first database, the historical table comprising a plurality of snapshots of data from the one or more database tables copied at different times; and
retrieving, in response to a query associated with the first account, data corresponding to a plurality of snapshots from the historical table using the first server instance and the first database but not using the second server instance and not the second database, wherein access of data in the historical table does not interfere with access to data in the second database.

10. The computer program product of claim 9, further comprising receiving a user provided input corresponding to a time value at which to clean up the snapshot of data from the one or more database tables stored in the historical table, wherein clean-up occurs at a frequency defined by the time value and the clean-up is completed according to a set of parameters received from a user that define how data is to be cleaned-up from the historical table.

11. The computer program product of claim 9, further comprising:
instructions for receiving a user provided input corresponding to a time value at which to copy the snapshot of data from the one or more database tables to a corresponding historical table, wherein the historical table collects snapshots of the data at a frequency defined by the time value.

12. The computer program product of claim 11, wherein the frequency defined by the time value is at least one of a daily time value, a weekly time value, a monthly time value, a quarterly time value or a yearly time value.

13. The computer program product of claim 9, wherein the first account is accessed by multiple users associated with the first account.

14. The computer program product of claim 9, wherein a display of data to a user associated with the first account is based at least in part on a defined role value.

15. The computer program product of claim 9, wherein the query is an SQL statement comprising one or more query object parameters.

16. The computer program product of claim 15, wherein the query object parameter is a time period parameter.

17. The computer program product of claim 15, wherein the query object parameter is a filter parameter.

18. An apparatus comprising:
one or more computer processors to execute one or more sets of program code instructions; and
one or more memories to hold the one or more sets of program code instructions, in which the one or more sets of program code instructions comprise program code to perform the following acts:
providing an interface of a software as a service (SaaS) platform to a plurality of customers associated with a plurality of SaaS platform accounts,
providing a first server instance within the SaaS platform to a first account, the first server instance being provided to a single account comprising the first account and having a first database,
providing a second server instance within the SaaS platform to a second account, the second server instance being provided to a different account comprising the second account and having a second database,
creating a historical table in the first database of the first server instance within the SaaS platform, copying a snapshot of data from one or more database tables of the first database to the historical table of the first database, the historical table comprising a plurality of snapshots of data from the one or more database tables copied at different times, and retrieving, in response to a query associated with the first account, data corresponding to a plurality of snapshots from the historical table using the first server instance and the first database but not using the second server instance and not the second database, wherein access of data in the historical table does not interfere with access to data in the second database.

19. The apparatus of claim 18, wherein the acts further comprise receiving a user provided input corresponding to a time value at which to clean up the snapshot of data from the one or more database tables stored in the historical table, wherein clean-up occurs at a frequency defined by the time value and the clean-up is completed according to a set of parameters received from a user that define how data is to be cleaned-up from the historical table.

20. The apparatus of claim 18, wherein the acts further comprise:

receiving a user provided input corresponding to a time value at which to copy the snapshot of data from the one or more database tables to a corresponding historical table, wherein the historical table collects snapshots of the data at a frequency defined by the time value.

21. The apparatus of claim 20, wherein the frequency defined by the time value is at least one of a daily time value, a weekly time value, a monthly time value, a quarterly time value or a yearly time value.

22. The apparatus of claim 18, wherein the first account is accessed by multiple users associated with the first account.

23. The apparatus of claim 18, wherein a display of data to a user associated with the first account is based at least in part on a defined role value.

24. The apparatus of claim 18, wherein the query is an SQL statement comprising one or more query object parameters.

25. The apparatus of claim 24, wherein the query object parameter is a time period parameter.

26. The apparatus of claim 24, wherein the query object parameter is a filter parameter.

\* \* \* \* \*